United States Patent
Hwang

(10) Patent No.: US 6,772,648 B2
(45) Date of Patent: Aug. 10, 2004

(54) METHOD AND APPARATUS FOR DETERMINING BEARING PARAMETERS

(75) Inventor: Wen Ruey Hwang, North Canton, OH (US)

(73) Assignee: The Timken Company, Canton, OH (US)

(*) Notice: Subject to any disclaimer, the term of this patent is extended or adjusted under 35 U.S.C. 154(b) by 0 days.

(21) Appl. No.: 10/274,326

(22) Filed: Oct. 18, 2002

(65) Prior Publication Data

US 2004/0074315 A1 Apr. 22, 2004

(51) Int. Cl.$^7$ ................................................. G01L 1/00
(52) U.S. Cl. ................................................. 73/862.541
(58) Field of Search .......................... 73/862, 333, 593, 73/862.632, 862.541, 862.041, 862.627; 384/459, 448, 536, 484; 324/174, 207.2

(56) References Cited

U.S. PATENT DOCUMENTS

| | | | |
|---|---|---|---|
| 4,015,468 A | | 4/1977 | Simon |
| 4,112,751 A | * | 9/1978 | Grunbaum .................... 75/141 |
| 4,203,319 A | * | 5/1980 | Lechler ...................... 73/141 A |
| 4,281,539 A | * | 8/1981 | Keller ........................ 73/862.54 |
| 5,140,849 A | * | 8/1992 | Fujita et al. ................. 73/118.1 |
| 5,248,939 A | * | 9/1993 | Brauer .......................... 324/174 |
| 5,336,996 A | * | 8/1994 | Rusnak ..................... 324/207.2 |
| 5,503,030 A | * | 4/1996 | Bankestrom ........... 73/862.627 |
| 5,952,587 A | * | 9/1999 | Rhodes et al. .......... 73/862.541 |
| 6,490,935 B1 | * | 12/2002 | Joki et al. ................. 73/862.49 |

OTHER PUBLICATIONS

Acoustic Identification of a Spun Cone Roller Bearing Defect—Anderson/Smith—RTD–vol. 13, Rail Transportation, 1997—pp. 19–25.
On–Board Real–Time Railroad Bearing Defect Detection and Monitoring—Sneed/Smith—pp. 149–153.
Measurement of the rotational slippage of the inner race of railroad bearings—Kesler/Stuart/Gray–SPIE vol. 2458—pp. 128–136.

* cited by examiner

Primary Examiner—Edward Lefkowitz
Assistant Examiner—Octavia Davis
(74) Attorney, Agent, or Firm—Polster, Lieder, Woodruff & Lucchesi

(57) ABSTRACT

A method for determining bearing parameters such as the radial load or interference fit of a bearing having a inner or outer race, secured by the interference fit with its mounting component, which experiences angular rotation relative to the mounting component in response to the radial load. Measurements of the angular velocity of the race and the mounting component are compared to determine the creep rate between the race and the mounting component. The observed creep rate and angular velocity measurements are utilized with either measured radial load data or interference fit data for the specific bearing application to extrapolate a curve fit for either the interference fit or the radial load experienced by the bearing, respectively.

17 Claims, 3 Drawing Sheets

METHOD AND APPARATUS FOR DETERMINING BEARING PARAMETERS

CROSS-REFERENCE TO RELATED APPLICATIONS

None.

STATEMENT REGARDING FEDERALLY SPONSORED RESEARCH

Not Applicable.

BACKGROUND OF THE INVENTION

The present invention relates to the determination of bearing parameters, and more particularly, to a method and apparatus for determining bearing radial loads or bearing interference fits based on data sets which identify relationships among either the measured bearing radial loads or the interference fit, the measured bearing inner ring or bearing outer ring creep rate, and the measured bearing rotational speed.

Arrangements for measuring radial forces or loads applied to rolling element bearings such as ball bearings, cylindrical bearings, tapered bearings, and the like have found a wide use in machines for producing and treating textile fabrics, paper, and foils of various kinds where the material being transferred by means of a roller or other rotationally driven element must be maintained at or below a predetermined tension. Various designs have been utilized to measure these radial forces, including the use of conventional load sensing devices such as load cells, strain gages, and displacement sensors.

For example, U.S. Pat. No. 4,203,319 to Lechler for an "Apparatus For Measuring Bearing Forces" discloses an apparatus for the measuring of external forces by means of a preloaded rolling element bearing which is provided with at least two strain gauges which serve to measure the forces applied to the rolling element bearings. By placing the strain gauges in locations between the outer ring of the bearing and the housing within which the bearing is mounted, the apparatus of the '319 Lechler patent is capable of measuring external forces exerted on a roller bearing.

Alternative configurations of apparatus for measuring radial forces acting upon a bearing are set forth in U.S. Pat. No. 4,112,751 to Grünbaum and U.S. Pat. No. 4,281,539 to Keller. The measuring apparatus disclosed in these patents essentially comprise two concentric rings interconnected by a web of material. A rolling element bearing transmits the force to be measured to one of the rings, while the other ring is held in a fixed position. As the one ring moves in relation to the fixed ring, the web of material interconnected the two rings is deformed, and the deformation is measured electrically by means of a load cell, strain gage, or displacement sensor.

When bearing race creep occurs, in certain applications it could eventually result in bearing damage. It would be advantageous to develop a low cost, practical, and accurate method and apparatus for the determination of the interference fit or radial loads acting on a rolling element bearing structure from measured values such as the rotational speed and bearing race creep rate, whereby an expected operational life of the bearing and mounting component systems may be determined.

BRIEF SUMMARY OF THE INVENTION

Briefly stated, an embodiment of the present invention provides an apparatus and a method for determining the radial load on a bearing having inner and outer races, one of which rotates relative to the other. The rotating race is secured by an interference fit with its mounting component and experiences rotation or creep at an observable rate relative to the mounting component. Measurement of the angular velocity of the rotating race relative to the corresponding mounting component is utilized to determine the creep rate between the rotating race and the mounting component. The determined creep rate is compared with predetermined radial load data correlated with the interference fit precision between the rotating race and the mounting component to identify the actual radial load experienced by the bearing.

In an alternate embodiment of the present invention, the measured angular velocity and determined creep rate, together with the known interference fit of the bearing are utilized to generate a unique curve-fit representative of the radial load experienced by the bearing components.

In an alternate embodiment of the present invention, an apparatus and a method are provided for determining the interference fit of a bearing having inner and outer races, one of which rotates relative to the other. The rotating race is secured by an interference fit with its mounting component and experiences rotation or creep at an observable rate relative to the mounting component. Measurement of the angular velocity of the rotating race relative to the corresponding mounting component is utilized to determine the creep rate between the rotating race and the mounting component. The determined creep rate is compared with predetermined interference fit data correlated with the radial load to identify the actual interference fit between the rotating race and the mounting component of the bearing.

In an alternate embodiment of the present invention, an apparatus and a method is provided for determining the interference fit of a bearing having inner and outer races, one of which rotates relative to a mounting component. The rotating race is secured by an interference fit with its mounting component and experiences rotation or creep at an observable rate under a measured radial load relative to the mounting component. Measurement of the radial load, creep rate, and the angular velocity of the rotating race relative to the corresponding mounting component is utilized to determine a unique curve-fit representative of the interference fit between the rotating race and the mounting component.

An apparatus of the present invention for providing data utilized in determining the radial load on a rolling element bearing such as a ball bearing, cylindrical bearing, tapered bearing, spherical bearing, or the like, includes a first Hall effect sensor positioned relative to the rotating bearing race and a second Hall effect sensor positioned relative to the corresponding mounting component to which the rotating bearing race is secured by means of an interference fit of predetermined bearing fitting practice. Both the bearing race and the corresponding mounting component include one or more target elements positioned to generate signals in the Hall effect sensors as they are carried thereby during rotation of the respective components. A microcontroller or Digital Signal Processor (DSP) receives the signals from the Hall effect sensors for subsequent processing. A resulting bearing radial load determination is generated by the microcontroller or DSP for display on an associated display unit or sending by communicational buses.

An apparatus of the present invention for providing data utilized in determining the interference fit between a bearing race and a corresponding mounting component, includes one or more strain gauges or load cells positioned to measure the radial load on the bearing race. A first Hall effect sensor positioned relative to the rotating bearing race and a second Hall effect sensor positioned relative to the corresponding mounting component to which the rotating bearing race is secured. Both the bearing race and the corresponding mounting component include one or more target elements positioned to generate signals in the Hall effect sensors as they are carried thereby during rotation of the respective components. A microcontroller or Digital Signal Processor (DSP) receives the signals from the strain gauges or load cells, and from the Hall effect sensors for subsequent processing. A resulting bearing interference fit determination is generated by the microcontroller or DSP for display on an associated display unit or sending by communicational buses.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

While the following description and embodiments are described in the context of a tapered roller bearing system, those of ordinary skill in the art will recognize that the present invention may be employed with any type of rolling element bearing, including ball bearings, cylindrical bearings, tapered bearings, spherical bearings, and the like.

Figure 1:
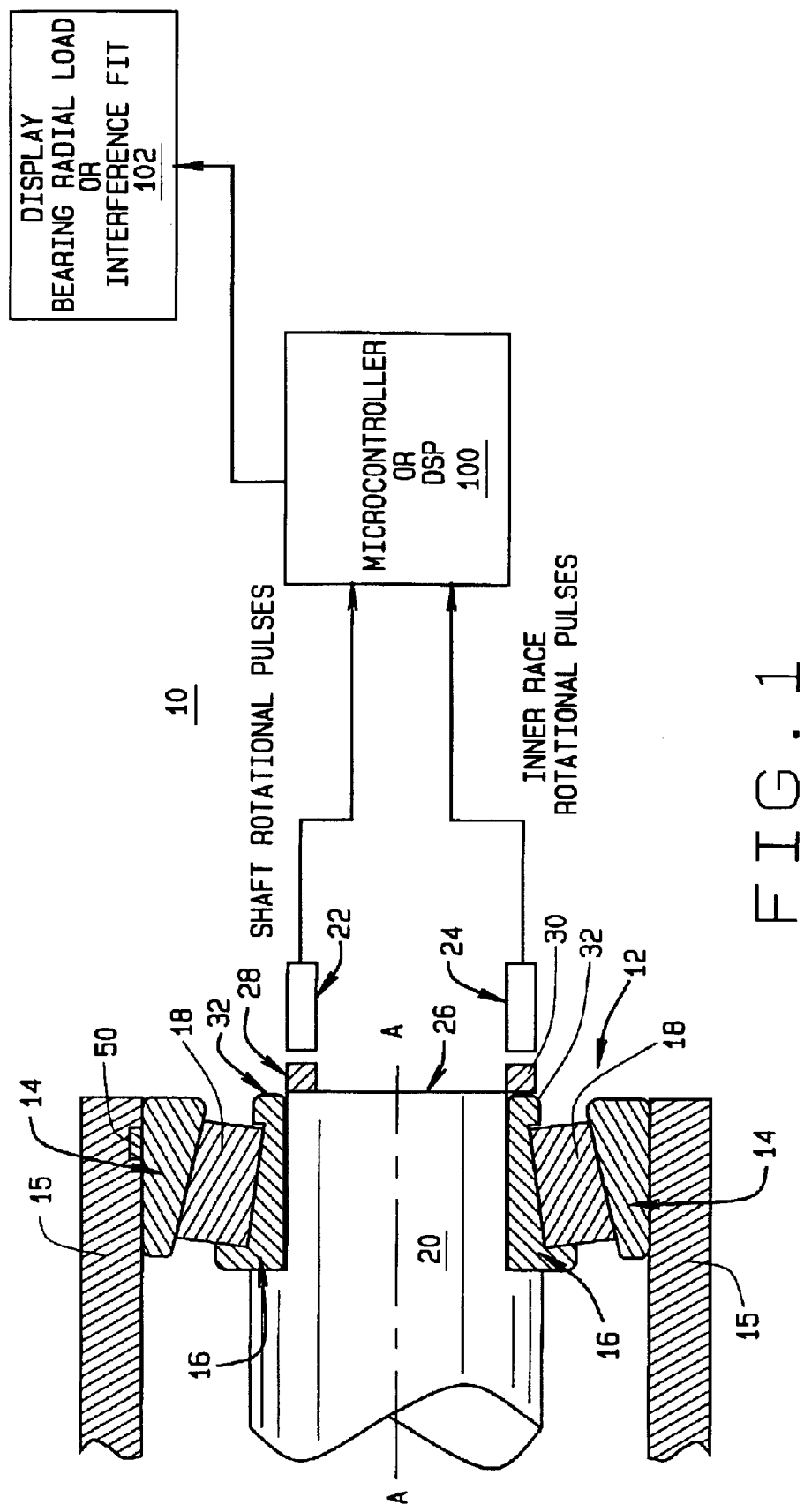
FIG. 1 is a side sectional view of a first embodiment of the sensing apparatus of the present invention used with a tapered bearing and positioned relative to a rotating shaft and a bearing inner ring or cone.

Turning to FIG. 1, a first configuration of the sensor apparatus of the present invention, indicated generally at 10, is shown positioned relative to a conventional bearing 12. The bearing 12 comprises an outer ring or outer race 14, commonly referred to as a cup when used with tapered bearings, an inner ring or inner race 16, commonly referred to as a cone when used with tapered bearings, and a plurality of tapered rollers 18 contained between the cup 14 and cone 16. The cone 16 of the bearing 12 is secured about one end 26 of a shaft 20 having a shaft axis A—A by means of an interference fit and the cup 14 of the bearing 12 is seated within housing 15.

The interference fit is preferably sized to a known tightness. For example, a fit with no tightness is referred to as having a 0-fit, an interference fit with a 5 $\mu$m tightness is referred to as a 5-fit, an interference fit with a 10 $\mu$m tightness is referred to as a 10-fit, and so on.

The apparatus of the present invention is readily adaptable for use with a variety of bearing applications. For example, as shown in FIG. 1, the present invention in a first configuration may be utilized with a first bearing application where the shaft 20 rotates about the shaft axis A—A which is coaxial with the axis of the inner race 16 that is mounted on the shaft 20. Alternatively, as shown in FIG. 2, the present invention may be utilized in a second configuration with a second bearing application wherein the shaft 20 and inner race 16 are stationary and the housing 15 and the outer race 14 rotates about the shaft axis A—A.

In the first bearing application, shown in FIG. 1, to provide signals from which the radial load on the bearing 12 can be determined, a pair of Hall effect sensors are utilized. The first Hall effect sensor 22 is positioned in an operative relationship with the end 26 of the shaft 20. One or more target elements 28 are affixed to the shaft end 26, at radial locations corresponding to the placement of the first Hall effect sensor 22, such that at least one target element 28 passes within detection range of the Hall effect sensor 22 for each complete rotation of the shaft 20 about the shaft axis A—A. Each time a target element 28 passes within the detection range of the Hall effect sensor 22, a signal pulse is generated by the Hall effect sensor 22 and transmitted to a microcontroller or digital signal processor (DSP) 100.

The second Hall effect sensor 24 is positioned in an operative relationship with the inner race 16. One or more target elements 30 are affixed to the inner race face 32, at radial locations from the shaft axis A—A corresponding to the placement of the second Hall effect sensor 24, such that at least one target element 30 passes within detection range of the Hall effect sensor 24 for each complete rotation of the inner race 16 about the shaft axis A—A. Each time a target element 30 passes within the detection range of the Hall effect sensor 24, a signal pulse is generated by the Hall effect sensor 24 and transmitted to the micro controller or digital signal processor (DSP) 100.

Figure 2:
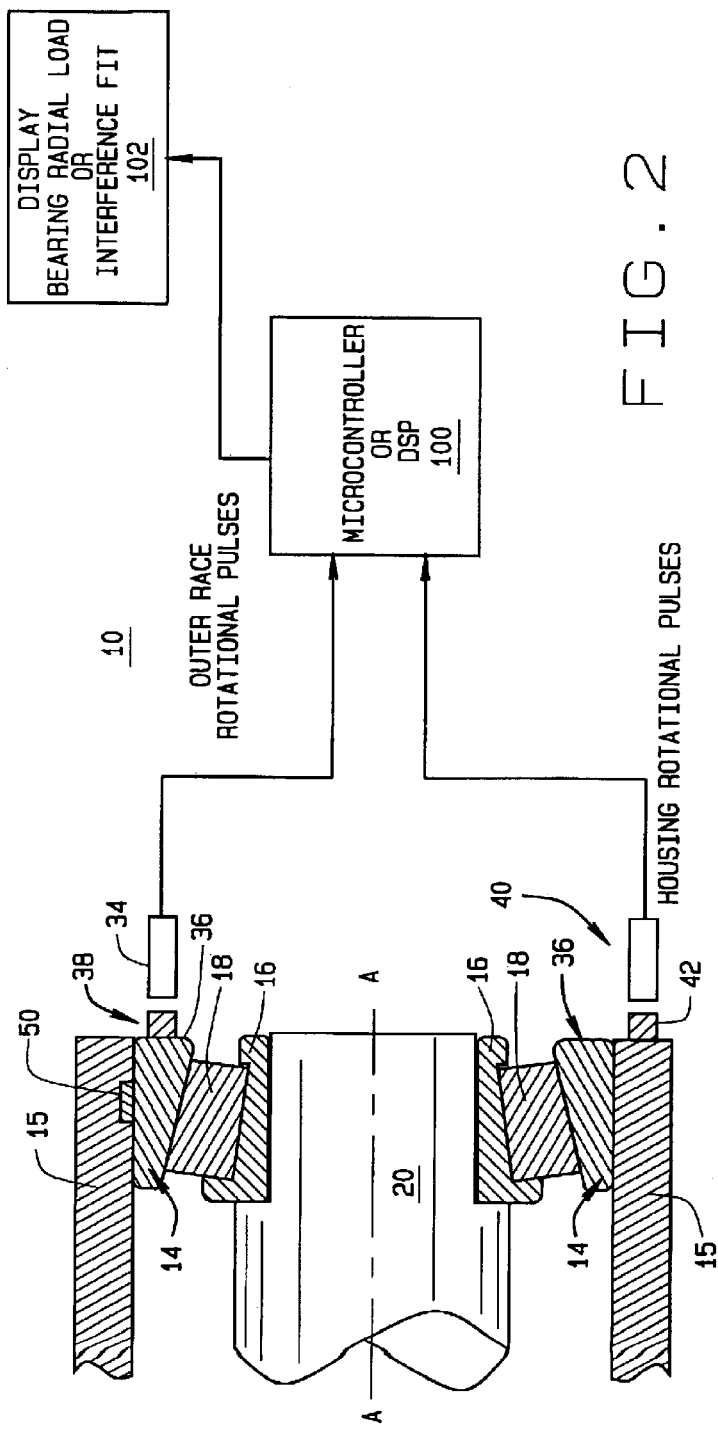
FIG. 2 is a side sectional view of an alternate embodiment of the sensing apparatus of the present invention used with a tapered bearing and positioned relative to a rotating housing and a bearing outer ring or cup.

Turning to FIG. 2, an alternate configuration of the sensor apparatus 10 for use with the second bearing application wherein the outer race 14 rotates about the shaft axis A—A relative to the coaxial mounting component 15, includes a pair of Hall effect sensors positioned relative to the bearing 12. The first Hall effect sensor 34 is positioned in an operative relationship with the back face 36 of the outer race 14. One or more target elements 38 are affixed to the back face 36, at radial locations corresponding to the placement of the first Hall effect sensor 34, such that at least one target element 38 passes within detection range of the Hall effect sensor 34 for each complete rotation of the outer race 14 about the shaft axis A—A. Each time a target element 38 passes within the detection range of the Hall effect sensor 34, a signal pulse is generated by the Hall effect sensor 34 and transmitted to a microcontroller or digital signal processor (DSP) 100.

The second Hall effect sensor 40 is positioned in an operative relationship with the coaxial mounting component 15. One or more target elements 42 are affixed to the housing 15, at radial locations from the shaft axis A—A corresponding to the placement of the second Hall effect sensor 40, such that at least one target element 42 passes within detection range of the Hall effect sensor 40 for each complete rotation of the coaxial mounting component 15 about the shaft axis A—A. Each time a target element 42 passes within the detection range of the Hall effect sensor 40, a signal pulse is generated by the Hall effect sensor 40 and transmitted to the microcontroller or digital signal processor (DSP) 100.

Figure 3:
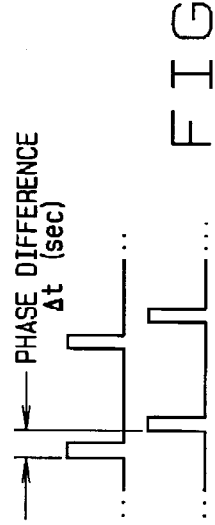
FIG. 3 is a representation of the signals received from the sensing apparatus utilized in either FIG. 1 or 2, illustrating a signal phase difference indicative of a creep rate for determining a radial load on a rolling element bearing or an interference fit of one of the bearing races.

In each of the embodiments shown in FIGS. 1 and 2, the timing of the signal pulse from the first Hall effect sensor in the pair 22, 24 and 34, 40 is compared with the timing of the signal pulse from the second Hall effect sensor in the corresponding pair by the microcontroller or DSP 100. The microcontroller or DSP 100 is configured to determine a lapsed time or phase difference $\Delta t$ between the start of a signal pulse from the first Hall effect sensor and the start of a signal pulse from the second Hall effect sensor, as shown in FIG. 3. The microcontroller or DSP 100 is further configured to utilize the observed lapsed time or phase difference $\Delta t$ from the Hall effect sensors in the pairs 22, 24 or 34, 40 to compute a creep rate between the observed components of the bearing 12.

In addition to the first and second Hall effect sensors 22, 24 and 34, 40, one or more strain gauges or load cell sensors 50 may optionally be disposed in operative relationship to either the outer race 14 or inner race 16. Each strain gauge or load cell sensor 50 generates a signal which is representative of the strain or load forces acting at that location. The signals generated by each strain gauge or load cell sensor 50 are transmitted to the microcontroller or digital signal processor (DSP) 100.

The microcontroller or DSP 100 is in communication with one or more conventional data storage components, such as internal or external random access memory or, read-only memory in which is stored one or more tables of data providing predetermined correlations between rotational speeds, creep rates, interference fits, and radial loads. The microcontroller or DSP 100 is configured to generate two curve-fit functions; (1) to predict interference fit as a function of radial load, rotational speed, and creep rate; and (2) to predict radial load as a function of interference fit, rotational speed, and creep rate.

Figure 4:
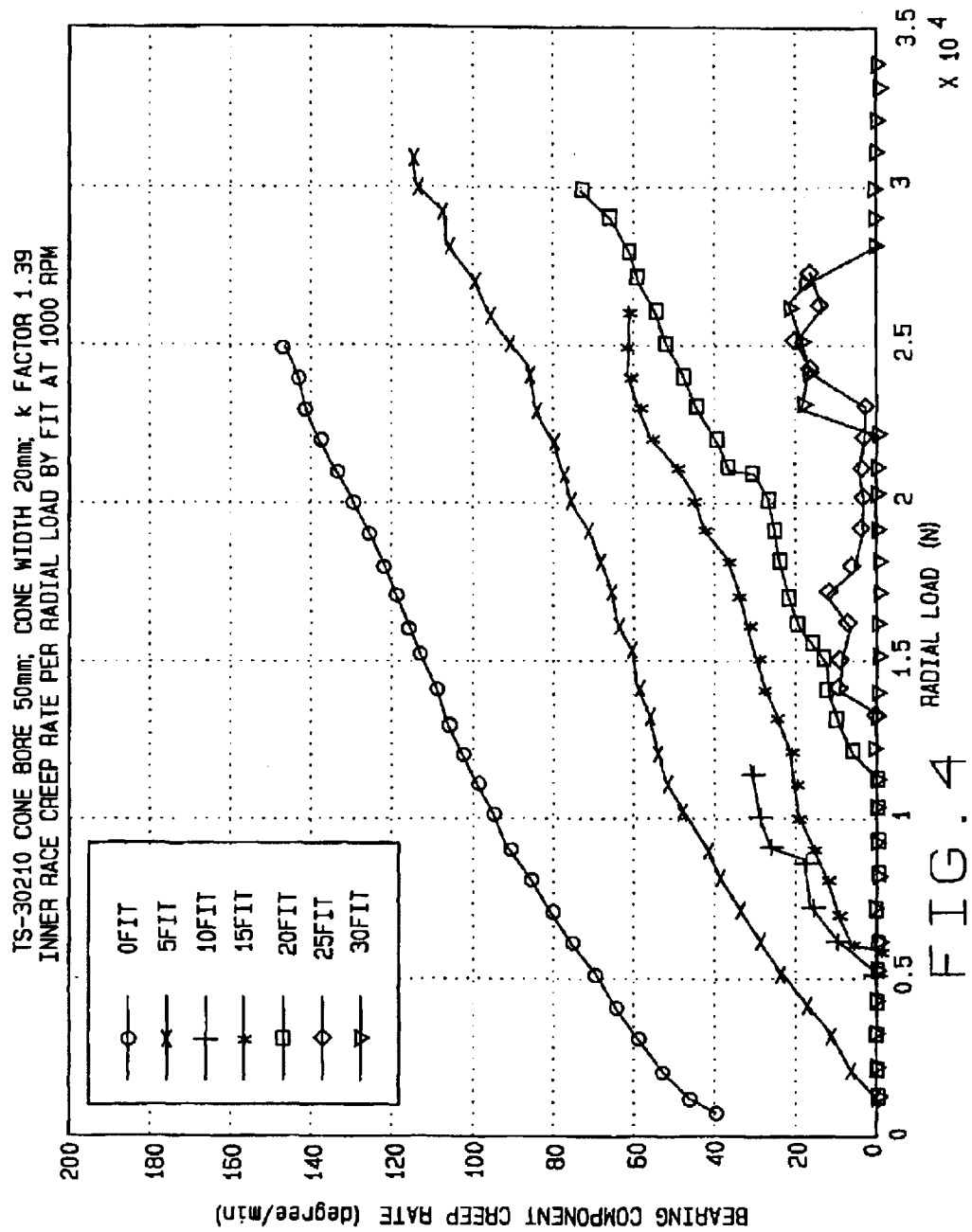
FIG. 4 is an exemplary chart illustrating, for a specific bearing type and configuration, entries in a data table for bearing inner ring creep rates versus radial load for a number of different interference fits between a rolling element bearing inner ring and a shaft.

For example, FIG. 4 illustrates an exemplary data table for a TS No. 30210 bearing supporting a shaft running at a constant 1000 RPM. The bearing had a cone bore of 50 mm, a cone width of 20 mm, and a K-factor of 1.39. The bearing inner race was formed from 8019 steel, and the rotating shaft was formed from 4340 steel. Those of ordinary skill in the art will recognize that different data tables corresponding to different types of bearings having different characteristics will be required, depending upon each application of the present invention. Various data tables may be stored in a memory, and accessed as required to identify predetermined correlations between rotational speeds, creep rates, interference fits, and radial loads for each particular bearing application or can be generated from the curve-fit functions.

The microcontroller or DSP 100 is further configured in one embodiment to cross reference the identified creep rate between the observed components of the bearing 12 with a known interference fit to determine from the corresponding data table a corresponding value for the radial load RL acting on the bearing 12. If the identified creep rate and known interference fit each correspond to entries in the data tables, the known value for the radial load RL associated with those entries is identified.

Alternatively, if either the identified creep rate or known interference fit does not correspond to an entry in the corresponding data table, but rather, corresponds to a value falling between two entries in the data table, the value for the radial load RL is interpolated, using conventional mathematical curve-fit techniques, by the microcontroller or DSP 100 as a function of the known interference fit, bearing rotational speed, and the identified creep rate. In either case, the identified or determined value for the radial load RL is displayed on an interconnected display unit 102.

The microcontroller or DSP 100 is further configured in one embodiment to cross reference the identified creep rate between the observed components of the bearing 12 with a measured radial load to determine from the corresponding data table a corresponding value for an interference fit between the bearing 12 and mounting component 15. If the identified creep rate and measured radial load each correspond to entries in the data tables, a value for the interference fit associated with those entries is identified.

Alternatively, if either the identified creep rate or measured radial load does not correspond to an entry in the corresponding data table, but rather, corresponds to a value falling between two entries in the data table, the value for the interference fit is interpolated, using conventional mathematical curve-fit techniques, by the microcontroller or DSP 100 as a function of the measured radial load, bearing rotational speed, and the identified creep rate. In either case, the identified or determined value for the interference fit is displayed on an interconnected display unit 102.

By monitoring the interference fit over time, the microcontroller or DSP 100 can determine if the interference fit is changing, and the rate of any detected change, to provide a representation of the acceptable bearing operational life.

Those of ordinary skill in the art will readily recognize that a variety of sensors may be utilized in the embodiments of the present invention in place of the Hall effect sensors 22, 24 and 34, 40. Any sensors which are capable of providing signals indicative of a creep rate between a component of bearing 12 and a mounting component to which it is secured by means of an interference fit may be utilized.

Depending on the applications, for example, an optical sensor may be utilized to observe target indicia on the surfaces of the rotating components, generating a signal each time the target indicia passes thereby. Additional alternative types of sensors include electrical pickups, mechanical rotation counters, or optical scanners.

Those of ordinary skill in the art will further recognize that the present invention is not limited to an apparatus and method for providing determinations of interference fit or radial loads in tapered roller bearings. Rather, it is anticipated that the present invention is readily adaptable to any type of rolling element bearing application wherein either the bearing inner race or bearing outer race is secured to a mounting component by an interference fit and the bearing experiences radial loads.

The method of the present invention for determining an interference fit and radial loads is applicable to any bearing application wherein an observable creep rate between two components is induced by the transference of a radial load through the components secured by an interference fit, and the parameters of the components are known or measurable, permitting a mathematical curve-fit technique to be employed to identify relationships there between.

Portions of the present invention can be embodied in the form of computer-implemented processes and apparatuses for practicing those processes. Portions of the present invention can also be embodied in the form of computer program code containing instructions embodied in tangible media, such as floppy diskettes, CD-ROMs, hard drives, or an other computer readable storage medium, wherein, when the computer program code is loaded into an executed by a microcontroller, digital signal processor, or computer, the microcontroller, digital signal processor, or computer becomes an apparatus for practicing the invention.

Portions of the present invention can also be embodied in the form of computer program code, for example, whether stored in a storage medium, loaded into and/or executed by a micro-controller, digital signal processor, or computer, or transmitted over some transmission medium, such as over electrical wiring or cabling, through fiber optics, or via electromagnetic radiation, wherein, when the computer program code is loaded into and executed by a computer, the micro-controller, digital signal processor, or computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for determining at least one parameter of a bearing having a bearing component secured by an interference fit to a coaxial mounting component such that the bearing component and the coaxial mounting component can each rotate separately about a common axis, the apparatus comprising:
   a first sensor in operative relationship to said bearing component, said first sensor configured to generate a signal representative of a rotational speed of said bearing component about said common axis;
   a second sensor in operative relationship to said coaxial mounting component, said second sensor configured to generate a signal representative of a rotational speed of said coaxial mounting component about said common axis;
   a processor configured to receive said generated signals from said first and second sensors, said processor configured to determine a creep rate between said bearing component and said coaxial mounting component from said received signals.

2. The apparatus of claim 1 wherein said processor is further configured to access data representative of relationships between a radial load, said crew rate, said interference fit, and said rotational speed of said bearing component, and to utilize said data to determine said radial load on said bearing component as a function of said creep rate, said interference fit, and said rotational speed of said bearing component.

3. The apparatus of claim 1 further including a third sensor in operative relationship to said bearing component, said third sensor configured to generate a signal representative of a radial load on said bearing component; and
   said processor further configured to receive said generated signal from said third sensor and to calculate said radial load from said received signal.

4. The apparatus of claim 3 wherein said processor is further configured to access data representative of relationships between a radial load, said creep rate, said interference fit, and said rotational speed of said bearing component, and to utilize said data to determine said interference fit between said bearing component and said coaxial mounting component as a function of said creep rate, said radial load, and said rotational speed of said bearing component.

5. The apparatus of claim 1 wherein said bearing component is a bearing inner ring.

6. The apparatus of claim 5 wherein said coaxial mounting component is a shaft, said bearing inner ring is concentrically mounted about said shaft.

7. The apparatus of claim 1 wherein said bearing component is a bearing outer ring.

8. The apparatus of claim 7 wherein said coaxial mounting component is a housing, said bearing outer ring is concentrically mounted about said housing.

9. The apparatus of claim 1 wherein said first sensor includes a Hall effect sensor in operative relationship to said bearing component and at least one target element secured to a surface of said bearing component, said Hall effect sensor configured to generate said signal upon detection of said at least one target element in proximity to said Hall effect sensor.

10. The apparatus of claim 1 wherein said second sensor includes a Hall effect sensor in operative relationship to said coaxial mounting component and at least one target element secured to a surface of said coaxial mounting component, said Hall effect sensor configured to generate said signal upon detection of said at least one target element in proximity to said Hall effect sensor.

11. The apparatus of claim 2 wherein said data is a database stored in a memory.

12. The apparatus of claim 1 wherein said processor comprises one of the set of a microcontroller, microcomputer, or digital signal processor.

13. A method for determining at least one parameter of a bearing having a bearing component secured by an interference fit to a coaxial mounting component such that the bearing component and the coaxial mounting component can each rotate separately about a common axis, the apparatus comprising:
   generating a first signal representative of a rotational speed of said bearing component about said common axis;
   generating a second signal representative of a rotational speed of said coaxial mounting component about said common axis;
   receiving at a processor said generated signals from said first and second sensors; and
   determining a creep rate between said bearing component and said coaxial mounting component from said received signals.

14. The method of claim 13 further including the step of determining a radial load acting upon said bearing component as a function of said determined creep rate, said rotational speed of said bearing component, and said interference fit.

15. The method of claim 13 further including:
   generating a signal representative of a radial load on said bearing component;
   receiving at a processor said generated signal from said third sensor; and
   calculating said radial load from said received signal.

16. The method of claim 15 further including the step of determining said interference fit between said bearing component and said coaxial mounting component as a function of said determined creep rate, said rotational speed of said bearing component, and said radial load.

17. The method of claim 15 further including the step of retrieving one or more entries in a data table using said determined creep rate and said radial load.

* * * * *

UNITED STATES PATENT AND TRADEMARK OFFICE
CERTIFICATE OF CORRECTION

PATENT NO. : 6,772,648 B2
DATED : August 10, 2004
INVENTOR(S) : Wen Ruey Hwang

It is certified that error appears in the above-identified patent and that said Letters Patent is hereby corrected as shown below:

Column 7,
Line 46, replace "crew" with -- creep --.

Signed and Sealed this

Twenty-ninth Day of November, 2005

JON W. DUDAS
*Director of the United States Patent and Trademark Office*